Patented Feb. 23, 1932

1,846,058

UNITED STATES PATENT OFFICE

DAVID L. JACOBSON, OF PITTSBURGH, PENNSYLVANIA, ASSIGNOR TO THE KOPPERS COMPANY, A CORPORATION OF PENNSYLVANIA

PROCESS FOR RECOVERING SODIUM THIOSULPHATE FROM GAS PURIFICATION LIQUORS AND THE LIKE

No Drawing.   Application filed December 4, 1926. Serial No. 152,729.

This invention relates to the recovery of sodium thiosulphate from complex solutions or suspensions, such as gas purification liquors, produced in the operation of so-called alkaline liquid purification processes for the removal of hydrogen sulphide and analogous acidic constituents from fuel gas.

An object of my invention is to provide an efficient process of effecting a separation of sodium thiosulphate from other materials present in such liquors.

A second object of my invention is to materially reduce the number of crystallization steps necessary to accomplish the separation and purification of sodium thiosulphate from such liquids.

A further object of my invention is to provide a process by which sodium thiosulphate may be recovered from solutions of the character indicated in substantially pure form.

A still further object of my invention is to provide a process whereby sodium thiosulphate may be recovered from liquids of the character indicated, in the pentahydrate form, rather than in the dihydrate form.

My invention has for further advantages such other improvements in operative advantages or results as may hereinafter be found to obtain.

Examples of alkaline liquid purification processes may be found in U. S. Patents Nos. 1,389,037 to Chas. J. Ramsburg and 1,390,098 to myself. In these and other processes of this general character, an alkaline absorbent solution is circulated over the flowing gas and through an actification stage where the original absorbent character of the solution is restored. The hydrogen sulphide upon absorption from the gas reacts with alkali to form soluble sodium hydrosulphide and in the actification stage, a current of air causes a reversal of this reaction, with consequent liberation of hydrogen sulphide and revivification of the original alkali.

In certain recent processes, material such as iron oxide is added to the solution, and aeration in the presence of this material causes a liberation of free sulphur, and regeneration of alkali, without emission of hydrogen sulphide.

In all such processes and particularly in those processes involving aeration in the presence of metallic compounds, a tendency toward side reactions is manifest. Such side reactions result primarily in the formation of sodium thiosulphate ($Na_2S_2O_3$), but other compounds are formed, such, for example, as sodium thiocyanate, ($NaSCN$), and sodium ferrocyanide ($Na_4Fe(CN)_6$). Sodium bicarbonate ($NaHCO_3$) is also formed by reaction of the alkali with carbon dioxide present in the gas being purified.

By reason of the formation of such side products, it occasionally becomes necessary to discard portions of the recirculating liquid, and to make up for this removal by adding additional water and alkali.

Such discarded portions, herein designated as gas purification liquors, contain, in addition to varying amounts of the materials recited above, considerable amounts of coloring matter and dirt. As an example of the composition of such a liquor, I cite the following results, determined in analysis of a liquor discarded from a gas purification plant:

| | |
|---|---|
| $Na_2S_2O_3$ | 115 grams per liter. |
| $NaSCN$ | 172 grams per liter. |
| $Na_2CO_3$ | 2.0 grams per liter. |
| $NaHCO_3$ | 10.1 grams per liter. |
| $Na_4Fe(CN)_6$ | 13.7 grams per liter. |
| Coloring matter | Present in small amount. |
| Dirt | Present in small amount. |

Ordinary evaporation and crystallization of this liquor would yield crude dirty sodium thiosulphate which would contain much sodium carbonate, sodium bicarbonate, and sodium ferrocyanide, as well as sodium thiocyanate. It would require a great number of recrystallizations to recover a pure sodium thiosulphate, and there would on this account be a very poor yield of the material.

I have discovered that, by employing a novel procedure which will be hereinafter described, practically all of the sodium carbonate, sodium bicarbonate, and sodium ferrocyanide, as well as most of the dirt and coloring matter and some of the sodium thiocyanate, can be removed in one operation.

I have also discovered that, by employing a further novel procedure also to be described hereinafter, a high yield of substantially pure sodium thiosulphate pentahydrate ($Na_2S_2O_3.5H_2O$), may be obtained in only two operations.

In order that my invention may be clearly set forth and understood, I now describe the precise manner in which it is to be performed, with reference to the solution hereinabove recited by way of example, but without limiting my invention to such illustrative instance.

In carrying out the process of my invention, I evaporate the liquor to such a point that all the salts present would crystallize out upon cooling. However, I do not permit the concentrated solution to cool, but filter or centrifuge it while hot, thereby effecting an efficient separation of the sodium thiosulphate and sodium thiocyanate from the sodium carbonate, bicarbonate and ferrocyanide, and the coloring and suspended matter.

The actual extent of evaporation necessary in this preliminary stage will vary somewhat with the nature of the liquor, and is best judged by the operator, but, in the specific instance of the liquor hereinabove set forth as an example, an evaporation down to about 28% of the original volume is preferred.

By "hot filtration" is meant filtration at any temperature above 40° C., and preferably between 60° C. and 90° C.

In the interests of obtaining a pure product, I may accomplish the filtration in the presence of Filter-cel, fuller's earth, activated charcoal, or the like, in the well-known manner. The efficiency of such filtration, from this standpoint, will thereby be considerably increased.

Upon evaporating the liquor recited above to 28% of its original volume, and filtering it at about 60° C., a cake is produced which has the following composition:

| | Per cent |
|---|---|
| $Na_2CO_3$ | 8.7 |
| $NaHCO_3$ | 4.2 |
| $Na_4Fe(CN)_6$ | 19.8 |
| NaSCN | 20.6 |
| $Na_2S_2O_3.5H_2O$ | 33.6 |
| Moisture, dirt, coloring matter, etc. | 13.1 |

This cake may be utilized for the recovery of constituents, such as sodium ferrocyanide, or it may be discarded.

The filtrate is then allowed to cool and is filtered, whereby crude crystals, practically free from sodium carbonate, sodium bircarbonate, and sodium ferrocyanide, and of a light cream color, are obtained. The average composition of these crystals is as follows:

| | Per cent |
|---|---|
| $Na_2S_2O_3.5H_2O$ | 75 |
| NaSCN | 25 |

If the ordinary methods of recrystallization are employed, a poor yield of sodium thiosulphate pentahydrate may be obtained, and this only after repeated recrystallizations.

I have discovered that, if these crude crystals are dissolved in a relatively small quantity of hot water, a mixture of the dihydrate and pentahydrate forms of sodium thiosulphate is thrown out of solution upon cooling, and if then this mixture of pentahydrate and dihydrate is separated and redissolved in a relatively large amount of hot water, which is then allowed to cool, a high yield of pure white sodium thiosulphate pentahydrate, practically free of sodium thiocyanate, is obtained.

To illustrate, following the example recited hereinabove, the crude thiosulphate crystals are dissolved in only 8% of their weight of hot water, and, on cooling and filtration, yield a large amount of a mixture of sodium thiosulphate dihydrate and pentahydrate, containing only 7.5% of sodium thiocyanate. This mixture is dissolved in 35% of its weight of hot water, and upon cooling and filtration yields a large amount of pure white sodium thiosulphate pentahydrate crystals, containing only 0.15% of sodium thiocyanate, and practically none of the other sodium salts present in the original liquor.

I may use any convenient means, such as a filter press or a centrifuge, for separating the various crystals from the liquors after their appearance in the solid phase.

The mother liquors from the various crystallizations are rich in sodium thiocyanate, and also contain sodium thiosulphate. These may be treated separately for recovery of sodium thiocyanate and/or sodium thiosulphate, or, in cyclic fashion, may be re-run through my process, for further recovery of their constituents.

In carrying out the final crystallization of the sodium thiosulphate, care must be taken to add water to make up for any loss by evaporation which occurs during the cooling stage prior to final separation of the crystals, in order that the pentahydrate form of said crystals will prevail.

My process presents a simple and expedient method of recovering substantially pure sodium thiosulphate from complex liquors such as those produced in the operation of liquid purification processes, requiring few operations, and effective in obtaining a high yield of pure material at low cost and in a short time.

My invention is not limited to the specific example given hereinabove by way of illustration, but may be defined within the scope of the following claims.

I claim as my invention:

1. The process of recovering sodium thiosulphate pentahydrate of high purity from gas purification liquor which comprises treating said liquor to recover therefrom a mixture of sodium thiosulphate and sodium thiocyanate, dissolving said mixture in a minimum amount of hot water, allowing the solution to cool, separating crystals of sodium thiosulphate dihydrate and pentahydrate therefrom, dissolving said crystals in hot water, cooling the solution, and separating crystals of sodium thiosulphate pentahydrate therefrom.

2. The process of recovering substantially pure sodium thiosulphate pentahydrate from gas purification liquor which comprises treating said liquor to recover therefrom a mixture of sodium thiosulphate and sodium thiocyanate, dissolving said mixture in a minimum amount of hot water, allowing the solution to cool, separating crystals of sodium thiosulphate dihydrate and pentahydrate therefrom, dissolving said crystals in 35% of their weight of hot water, allowing the solution to cool, adding water to make up for evaporation loss during cooling, and filtering the cool solution to separate therefrom crystals of sodium thiosulphate pentahydrate.

3. The process of recovering substantially pure sodium thiosulphate pentahydrate from gas purification liquor which comprises evaporating said liquor until substantially all constituents other than sodium thiosulphate and sodium thiocyanate are thrown out of solution, filtering said liquor while warm, allowing the filtrate to cool, removing therefrom a mixture of sodium thiosulphate and sodium thiocyanate, dissolving said mixture in a minimum amount of hot water, allowing the solution to cool, separating crystals of sodium thiosulphate therefrom, dissolving said crystals in 35% of their weight of hot water, cooling the solution and separating therefrom crystals of sodium thiosulphate pentahydrate.

In testimony whereof, I have hereunto subscribed my name this 2nd day of December 1926.

DAVID L. JACOBSON.